US011376646B2

(12) United States Patent
Yokoi et al.

(10) Patent No.: US 11,376,646 B2
(45) Date of Patent: Jul. 5, 2022

(54) HOT-STAMPED TRIM COMPONENT

(71) Applicant: TOYODA IRON WORKS CO., LTD., Toyota (JP)

(72) Inventors: Kazuhiko Yokoi, Toyota (JP); Yasuhisa Sakashita, Toyota (JP)

(73) Assignee: Toyoda Iron Works Co., Ltd., Toyota (JP)

( * ) Notice: Subject to any disclaimer, the term of this patent is extended or adjusted under 35 U.S.C. 154(b) by 0 days.

(21) Appl. No.: 16/881,772

(22) Filed: May 22, 2020

(65) Prior Publication Data

US 2020/0282441 A1    Sep. 10, 2020

Related U.S. Application Data

(62) Division of application No. 15/529,692, filed as application No. PCT/JP2015/082472 on Nov. 18, 2015, now abandoned.

(30) Foreign Application Priority Data

Nov. 28, 2014  (JP) .............................. JP2014-242273

(51) Int. Cl.
*B21D 22/20*  (2006.01)
*B21D 24/16*  (2006.01)
(Continued)

(52) U.S. Cl.
CPC ........... *B21D 22/208* (2013.01); *B21D 22/26* (2013.01); *B21D 24/16* (2013.01); *B23K 26/00* (2013.01);
(Continued)

(58) Field of Classification Search
CPC ...... B21D 22/00; B21D 22/02; B21D 22/022; B21D 22/10; B21D 22/20; B21D 22/205;
(Continued)

(56) References Cited

U.S. PATENT DOCUMENTS 342,173 A     5/1886  Bock
9,039,073 B2  5/2015  Yajima et al.
(Continued)

FOREIGN PATENT DOCUMENTS

DE    102011054866 A1 *  5/2013  ............. C21D 1/673
DE    10 2013 202 609 A1    8/2014
(Continued)

OTHER PUBLICATIONS

Translation—Arns—DE102011054866A1—Translated Apr. 16, 2021 (Year: 2013).*

(Continued)

*Primary Examiner* — Gregory D Swiatocha
*Assistant Examiner* — Bobby Yeonjin Kim
(74) *Attorney, Agent, or Firm* — Finnegan, Henderson, Farabow, Garrett & Dunner, LLP (57) ABSTRACT

A hot-stamped and trimmed part is produced by hot pressing a blank and then cutting off an excess outer peripheral portion by laser machining, an outer peripheral shape of the hot-stamped and trimmed part includes a laser trim line formed by cutting in the laser machining, and a press trim line formed by shearing in the hot pressing or pressing performed before the hot pressing, and the laser trim line and the press trim line are connected via a projecting corner portion.

6 Claims, 5 Drawing Sheets

(51) Int. Cl.
  *B23K 26/38* (2014.01)
  *B23K 26/00* (2014.01)
  *B21D 22/26* (2006.01)
  *B21D 53/88* (2006.01)
  *B21D 28/02* (2006.01)

(52) U.S. Cl.
  CPC .............. *B23K 26/38* (2013.01); *B21D 28/02* (2013.01); *B21D 53/88* (2013.01)

(58) Field of Classification Search
  CPC .... B21D 22/206; B21D 22/208; B21D 22/26; B21D 24/16; B21D 35/001; B21D 28/00; B21D 28/02; B21D 28/14; B23K 26/0093; B23K 26/38
  See application file for complete search history.

(56) References Cited

U.S. PATENT DOCUMENTS

| | | | | |
|---|---|---|---|---|
| 9,610,657 | B2* | 4/2017 | Jang | B21D 37/12 |
| 9,616,481 | B2* | 4/2017 | Okuda | B21D 35/001 |
| 2011/0283851 | A1* | 11/2011 | Overrath | B21D 22/00 83/15 |
| 2015/0174634 | A1 | 6/2015 | Nishimura et al. | |
| 2016/0152277 | A1 | 6/2016 | Rocheblave | |

FOREIGN PATENT DOCUMENTS

| | | |
|---|---|---|
| JP | 9-277072 | 10/1997 |
| JP | 2004-351559 | 12/2004 |
| JP | 2010-36217 | 2/2010 |
| KR | 101315491 B1 | 10/2013 |
| WO | WO 2013/154114 A1 | 10/2013 |
| WO | WO 2013/191256 A1 | 12/2013 |

OTHER PUBLICATIONS

YouTube Video—https://www.youtube.com/watch?v=4mhT1a28qO0—Smithy Industries, "Work Holding Setup", Aug. 20, 2010, 30 sec mark (Year: 2010).

Extended European Search Report for European Application No. 15862954.3 dated Jul. 24, 2018.

International Search Report issued in International Patent Application No. PCT/JP2015/082472 dated Dec. 15, 2015.

Written Opinion of the ISA issued in International Patent Application No. PCT/JP2015/082472 dated Dec. 15, 2015.

* cited by examiner

HOT-STAMPED TRIM COMPONENT

CROSS-REFERENCE TO RELATED APPLICATIONS

This is a division of U.S. application Ser. No. 15/529,692, which is a national phase application of International Application No. PCT/JP2015/082472, filed Nov. 18, 2015, which claims the priority of Japanese Application No. 2014-242273, filed Nov. 28, 2014, the content of each of which is incorporated herein by reference.

TECHNICAL FIELD

The present invention relates to an improvement in hot-stamped and trimmed parts that are produced by cutting off an excess outer peripheral portion by laser machining after forming by hot pressing.

BACKGROUND ART

In the case of performing hot pressing in order to cut off an excess outer peripheral portion by shearing with a press die simultaneously with forming by bending etc., post-machining may be required due to burrs etc. It is therefore proposed to cut off an excess outer peripheral portion by laser machining after performing hot pressing (see Patent Document 1).

RELATED ART DOCUMENTS

Patent Documents

Patent Document 1: Japanese Patent Application Publication No. H09-277072

SUMMARY OF THE INVENTION

Problem to be Solved by the Invention

However, cutting off the entire periphery by laser machining increases machining cost and machining time and thus reduces productivity.

The present invention was developed in view of the above circumstances and it is an object of the present invention to improve productivity of hot-stamped and trimmed parts that are produced by cutting off an excess outer peripheral portion by laser machining after forming by hot pressing.

Solution to Problem

To achieve the above object, a first aspect of the invention provides a hot-stamped and trimmed part that is produced by hot pressing a blank and then cutting off an excess outer peripheral portion by laser machining, the hot-stamped and trimmed part characterized in that (a) an outer peripheral shape of the hot-stamped and trimmed part includes a laser trim line formed by cutting in the laser machining, and a press trim line formed by shearing in the hot pressing or pressing performed before the hot pressing, and (b) the laser trim line and the press trim line are connected via a projecting corner portion.

A second aspect of the invention provides the hot-stamped and trimmed part recited in the first aspect of the invention, characterized in that one of the laser trim line and the press trim line has a recessed portion that is continuous with the corner portion, and the other of the laser trim line and the press trim line is connected to the one trim line so as to intersect an opening end of the recessed portion.

A third aspect of the invention provides the hot-stamped and trimmed part recited in the second aspect of the invention, characterized in that the recessed portion is a repair portion that is used for positioning when repairing the hot-stamped and trimmed part.

A fourth aspect of the invention provides the hot-stamped and trimmed part recited in any one of the first to third aspects of the invention, characterized in that an external angle of the corner portion is in a range from 20° to 60°.

A fifth aspect of the invention provides the hot-stamped and trimmed part recited in any one of the first to fourth aspects of the invention, characterized in that (a) the hot-stamped and trimmed part is a center pillar reinforcement that is disposed so as to extend in a vertical direction on a side of a vehicle and that is fixedly attached at its both upper and lower ends to a vehicle body, and (b) an outer peripheral shape of each of the upper and lower ends is formed by the laser trim line, and an outer peripheral shape of each of both sides of an intermediate portion connecting the upper and lower ends is formed by the press trim line.

Advantageous Effects of the Invention

The outer peripheral shape of the hot-stamped and trimmed part as described above includes the laser trim lines and the press trim lines. Accordingly, only a minimum required range, such as a portion for which post-machining is required due to burrs etc., need only be cut off by laser machining. This reduces machining cost and machining time and thus improves productivity. The laser trim line and the press trim line are connected via the projecting corner portions. Accordingly, the shape of the connection portion therebetween is formed stably regardless of relative positional displacement between the trim lines due to variation in machining performance. Variation in machining quality which is caused by stepped portions, projections, etc. resulting from variation in machining performance is thus restrained as compared to the case where, e.g., the trim lines are smoothly connected so as to form a straight line, an arc, etc.

The second aspect of the invention is the case where the other of the laser trim line and the press trim line is connected to the one trim line so as to intersect the opening end of the recessed portion formed in the one laser trim line. For example, even when the laser trim line and the press trim line are connected so as to form a straight line or a gentle curve, forming the recessed portion in the one trim line at a position immediately before the connection portion allows the trim lines to be connected via the projecting corner portion (one corner portion of the opening end). The trim lines can thus be appropriately connected while restraining variation in machining quality.

In the third aspect of the invention, the laser trim line and the press trim line are connected via the recessed portion to be used as a repair portion. Accordingly, design of the outer peripheral shape of the hot-stamped and trimmed part need not be changed, and variation in machining quality can be easily restrained.

In the fourth aspect of the invention, the external angle of each corner portion is in the range from 20° to 60°. In other words, the internal angle of each corner portion is an obtuse angle in the range from 120° to 160°. Accordingly, the trim lines can be relatively smoothly connected while restraining variation in machining quality.

The fifth aspect of the invention relates to the center pillar reinforcement, and the upper and lower ends of the center pillar reinforcement are formed by the laser trim lines, and both sides of the intermediate portion connecting the ends are formed by the press trim lines. This reduces machining cost and machining time and thus improves productivity as compared to the case where the entire periphery is cut off by laser machining. That is, the upper and lower ends of the center pillar reinforcement are curved so as to be tilted toward the interior side of the vehicle with respect to the intermediate portion or are formed in a complicated shape by bending in order to fix the upper and lower ends to the vehicle body. It is therefore difficult to appropriately cut the upper and lower ends by shearing in a pressing process due to the tendency to form burrs etc., and it is appropriate to cut the upper and lower ends by laser machining. On the other hand, since both sides of the intermediate portion have a relatively flat shape, both sides of the intermediate portion can be appropriately cut even by shearing in a pressing process. Accordingly, combining shearing in a pressing process and laser machining can achieve low machining cost and high productivity while ensuring predetermined machining quality.

BRIEF DESCRIPTION OF DRAWINGS

FIGS. 1A and 1B show two views of a center pillar reinforcement according to an embodiment of the present invention, where

FIGS. 7A and 7B show two views of a roof reinforcement, illustrating another embodiment of the present invention, where

MODES FOR CARRYING OUT THE INVENTION

For example, the hot-stamped and trimmed part of the present invention is applied in a preferable manner to various vehicle reinforcements (reinforcing members) such as a center pillar reinforcement, other pillar reinforcements, and a roof reinforcement. However, the hot-stamped and trimmed part of the present invention is also applicable to other structural members for vehicles, or members for applications other than vehicle applications. A steel sheet for hot pressing that is quenched and hardened by hot pressing is preferably used as the blank.

The press trim line may be formed by shearing during forming such as bending or drawing in hot pressing. However, for example, in the case where a part of the outer peripheral shape of the blank obtained by blanking (shearing of the entire periphery) in cold pressing remains in the final shape, the part that remains in the final shape may form a part of the outer peripheral shape of the hot-pressed and trimmed part. In the case of forming the press trim line by shearing in the hot pressing, a portion located outside the press trim line can be removed. However, a slit (elongated through hole) may only be formed along the press trim line. In the case of forming the press trim line by pressing, a through hole etc. may be simultaneously formed by the pressing.

The laser trim line is a portion formed by cutting away the excess outer peripheral portion by laser machining after the hot pressing. In the case of forming the laser trim line by laser machining, a through hole etc. may also be formed by the laser machining in a tilted portion or a side surface which is difficult to machine by shearing in the pressing.

The outer peripheral shape of the hot-stamped and trimmed part may be formed by only the laser trim line and the press trim line. However, the outer peripheral shape may include a portion formed by other processing such as machining. The external angle of the corner portion where the laser trim line and the press trim line are connected is in the range from 20° to 60° (the internal angle of the corner portion is an obtuse angle of 120° to 160°) in the fourth aspect of the invention. However, when carrying out other aspects of the invention, the external angle may be less than 20° or may be more than 60°. For example, the corner portion may be a corner portion where the laser trim line and the press trim line intersect at substantially right angles. Post-machining may be additionally performed as necessary so as to round or chamfer the corner portion.

In the second aspect of the invention, the laser trim line may have the recessed portion or the press trim line may have the recessed portion, and one of a pair of corner portions at the opening end of the recessed portion corresponds to the projecting corner portion to which the other of the laser trim line and the press trim line is connected. In the case where the laser trim line has the recessed portion, the recessed portion is formed so as to intersect at a predetermined angle the press trim line formed in advance, whereby the projecting corner portion is formed. The second aspect of the invention is applied in a preferable manner to the case where the laser trim line and the press trim line are connected so as to form a straight line or a gentle curve, and forming the recessed portion allows these trim lines to be connected appropriately. However, when carrying out other aspects of the invention, the recessed portion need not necessarily be formed. In the third aspect of the invention, the repair portion that is used for positioning when repairing the hot-stamped and trimmed part is used as the recessed portion. However, when carrying out the second aspect of the invention, the laser trim line and the press trim line may be connected by a recessed portion that is additionally formed in a predetermined portion of the outer peripheral shape regardless of whether the repair portion is present or not.

In the fifth aspect of the invention, the outer peripheral shape of each of the upper and lower ends of the center pillar reinforcement is partially or entirely formed by the laser trim line. However, when carrying out other aspects of the invention, only one of the upper and lower ends may be formed by the laser trim line, and the remaining outer peripheral portion may be formed by the press trim line etc. For example, in the case of a vehicle structural member having a longitudinal shape and supported with its both longitudinal ends being fixed to a vehicle body, even if the vehicle structural member is a member other than the center pillar reinforcement, it is desirable that the outer peripheral shape of each of the longitudinal ends having a complicated shape be entirely or partially formed by a laser trim line, and the outer peripheral shape of each of both sides of an intermediate portion connecting the longitudinal ends be formed by a press trim line.

Embodiments

Embodiments of the present invention will be described in detail below with reference to the accompanying drawings. The figures in the following embodiments are shown simplified or deformed as appropriate for the purpose of illustration, and each part is not necessarily drawn at an accurate dimensional ratio, in an accurate shape, etc.

Figure 1A:
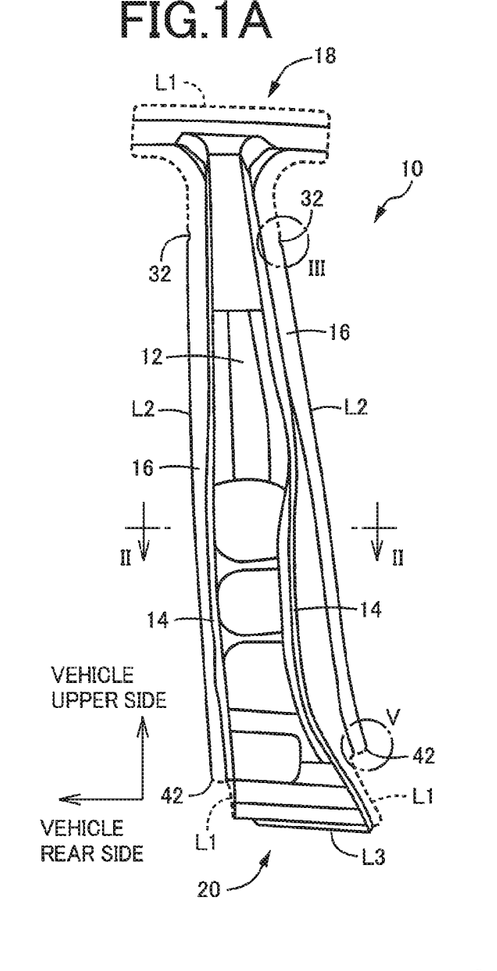
FIG. 1A is a front view as viewed from a vehicle exterior side.
Figure 1B:
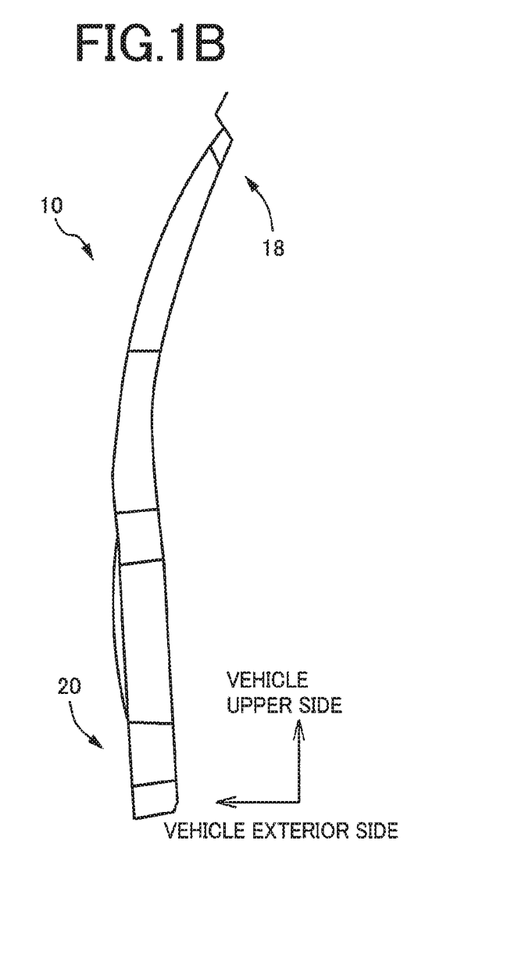
FIG. 1B is a right side view.
Figure 2:
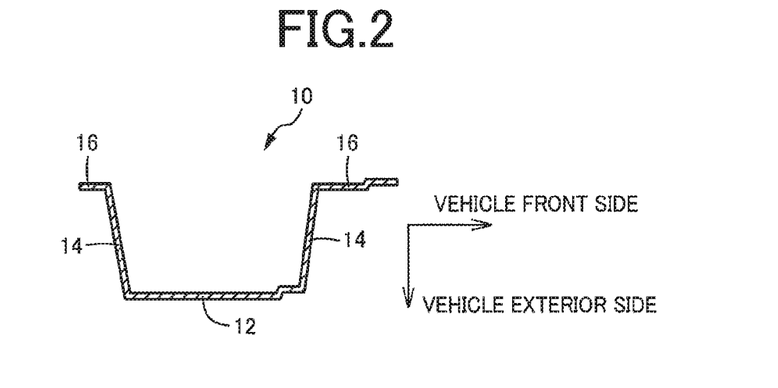
FIG. 2 is an enlarged sectional view taken along line II-II and viewed in the direction of arrow II-II in FIG. 1A.
Figure 3:
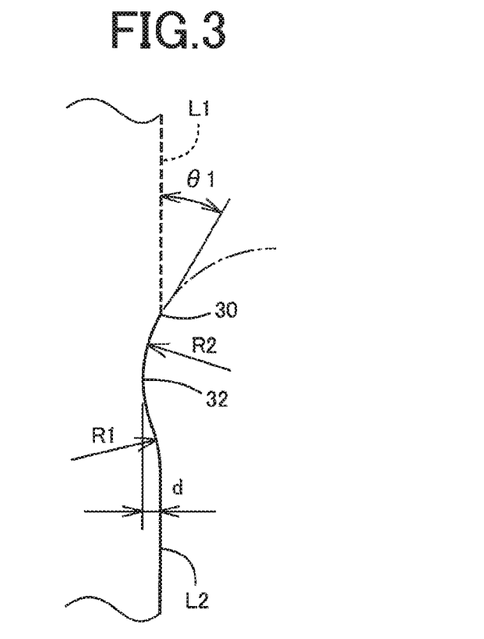
FIG. 3 is an enlarged view of a region III in FIG. 1A.
Figure 4:
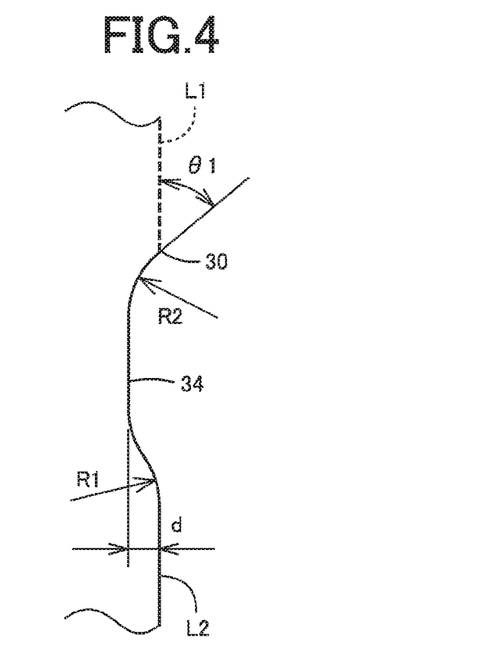
FIG. 4 is an enlarged view of another example of the region III in FIG. 1A.
Figure 5:
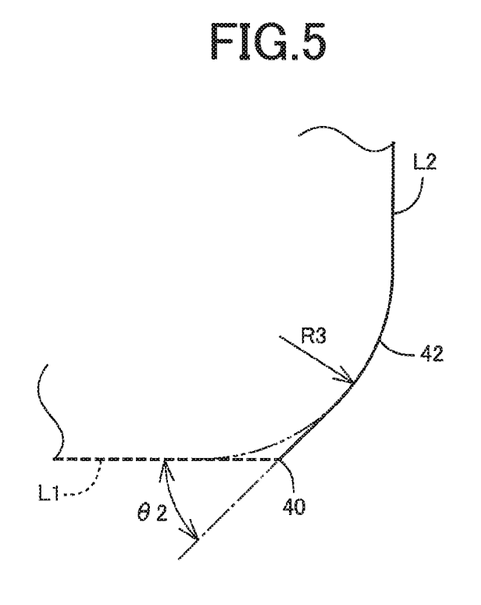
FIG. 5 is an enlarged view of a region V in FIG. 1A.

FIGS. 1A and 1B show two views of a center pillar reinforcement 10 for vehicles according to an embodiment of the present invention, where FIG. 1A is a front view as viewed from a vehicle exterior side, and FIG. 1B is a right side view. FIG. 2 is an enlarged sectional view taken along line II-II and viewed in the direction of arrow II-II in FIG. 1A. FIG. 3 is an enlarged view of a region III in FIG. 1A, FIG. 4 is an enlarged view of another example of the region III in FIG. 1A, and FIG. 5 is an enlarged view of a region V in FIG. 1A. The center pillar reinforcement 10 is disposed on the right side of the vehicle. The center pillar reinforcement 10 has a longitudinal shape that is long in the vertical direction of the vehicle, and as shown in FIG. 2, has a hat (brimmed-hat)-shaped section taken in a substantially horizontal direction perpendicular to the longitudinal direction of the longitudinal shape. The center pillar reinforcement 10 has a projecting wall portion 12, a pair of standing wall portions 14 bent toward the same side from both ends of the projecting wall portion 12, and a pair of flange portions 16 extending outward from the tip ends of the standing wall portions 14. The center pillar reinforcement 10 is disposed in the vertical direction of the vehicle in such an attitude that the projecting wall portion 1:2 projects toward the vehicle exterior side, and the center pillar reinforcement 10 is supported with its both vertical ends 18, 20 being fixed to a vehicle body. The center pillar reinforcement 10 thus receives a load applied from the vehicle the exterior side. A center pillar outer plate having a hat-shaped section is disposed on this center pillar reinforcement 10 on the vehicle exterior side and is fixed to the pair of flange portions 16 by welding etc.

The center pillar reinforcement 10 is a hot-stamped and trimmed part that is produced by hot pressing a blank 22 (see FIGS. 6A and 6B), such as a steel sheet for hot pressing, into a shape having the hat-shaped section and then cutting a part of the outer peripheral shape by laser machining. Specifically, the T-shaped upper end 18 that is fixed to a roof side rail etc. of the vehicle body is curved so as to be tilted toward the interior side of the vehicle as it approaches the upper side, and is formed in a complicated shape by bending in order to fix the upper end 18 to the vehicle body. Accordingly, it is difficult to appropriately cut the upper end 18 by shearing in a pressing process due to the tendency to form burrs etc. The outer peripheral shape is therefore formed by laser machining. For example, if the upper end 18 is tilted by 5° or more with respect to the direction perpendicular to the direction of pressing, it is difficult to appropriately cut the upper end 18 by shearing in a pressing process. The lower end 20 that is fixed to a side sill etc. of the vehicle body is also formed in a complicated shape by bending in order to fix the lower end 20 to the vehicle body. Accordingly, it is difficult to appropriately cut the lower end 20 by shearing in a pressing process due to the tendency to form burrs etc. The outer peripheral shape on both sides of the lower end 20 is therefore formed by laser machining. Outlines L1 shown by dashed lines in FIGS. 1A, 3 to 5, and 6C are laser trim lines cut by laser machining. Although the laser trim lines L1 are lines showing the outer peripheral shape of the center pillar reinforcement 10, the laser trim lines L1 are shown by dashed lines in the figures in order to clearly show the cutting range of laser machining.

Both sides of an intermediate portion connecting the upper end 18 and the lower end 20, namely the flange portions 16, have the shape of a relatively flat plate and can be appropriately cut by shearing in the hot pressing. Outlines L2 on both sides are press trim lines formed by shearing in the hot pressing. A part of the outer peripheral shape of the blank 22 obtained by blanking (shearing of the entire periphery) from a sheet plate etc. in cold pressing remains in the final shape. An outline L3 showing the lower edge of the lower end 20 is the part remaining in the final shape. The outline L3 is also a press trim line.

The laser trim line L1 and the press trim line L2 are connected via a projecting corner portion. Specifically, as can be seen from FIG. 3, in the region III where the laser trim line L1 of the upper end 18 and the press trim line L2 are connected to each other, the trim lines L1, L2 are connected via a corner portion 30 where the trim lines L1, L2 intersect at an external angle θ1. Ideally, the trim lines L1, L2 are connected to form a straight line. However, since variation in shape is likely to occur due to a stepped portion etc. resulting from variation in machining performance etc., the projecting corner portion 30 is formed so that the trim lines L1, L2 are connected via the projecting corner portion 30. That is, the press trim line L2 has an arc-shaped recessed portion 32 formed at a position before the corner portion 30 so as to be continuous with the corner portion 30. The straight laser trim line L1 is connected to the press trim line L2 so as to intersect the opening end of the recessed portion 32, whereby the corner portion 30 is formed. For example, the recessed portion 32 has a radius R2 of about 5 mm to 10 mm, and an alternate long and short dash line shows the shear shape in the hot pressing. The portion shown by the alternate long and short dash line is removed when cutting along the laser trim line L1 by laser machining. The recessed portion 32 is smoothly connected to a straight portion of the press trim line L2 so as to form an arc with a radius R1 of about 5 mm to 10 mm. The recessed portion 32 has a depth dimension d of about 1 mm to 2 mm from the straight portion, and for example, the external angle θ1 of the corner portion 30 is in the range from about 20° to 60°. Although FIG. 3 is an enlarged view of the connection portion on the vehicle front side, the connection portion on the vehicle rear side is also configured similarly.

FIG. 4 is a view illustrating another example of the recessed portion that is continuous with the corner portion 30. A recessed portion 34 is a repair portion that is used for positioning when repairing the center pillar reinforcement 10. The recessed portion 34 has a straight portion having a predetermined length. The laser trim line L1 and the press trim line L2 may also be connected by using this recessed portion 34. The radii R1, R2, the depth dimension d, and the external angle θ1 are set appropriately so that the recessed portion 34 can be used as the repair portion. The laser trim line L1 may have the recessed portion 32, 34, and the recessed portion 32, 34 may be formed by laser machining. In this case, the opening end on the lower side of the recessed portion 32, 34 intersects the straight portion of the press trim line L2 at a predetermined external angle θ1.

Referring back to FIG. 1A, in the region V where the laser trim line L1 of the lower end 20 and the press trim line L2 are connected to each other, the trim lines L1, L2 are connected via a corner portion 40 where the trim lines L1, L2 intersect at an external angle θ2, as can be seen from FIG. 5. Ideally, the trim lines L1, L2 are smoothly connected at a convex arc-shaped corner as shown by a long dashed double-short dashed line. However, since variation in shape is likely to occur due to a stepped portion etc. resulting from variation in machining performance etc., the projecting corner portion 40 is formed so that the trim lines L1, L2 are connected via the projecting corner portion 40. Specifically, the press trim line L2 has a convex arc-shaped portion 42 of a predetermined radius R3 formed at a position before the corner portion 40. As the convex arc-shaped portion 42 is extended straight, from its intermediate, position, in a direction of a tangent line to the convex arc-shaped portion 42, the corner portion 40 is formed that intersects the straight laser trim line L1 at a predetermined external angle θ2. An alternate long and short dash line shows the shear shape in the hot pressing, the portion shown by the alternate long and short dash line is removed when cutting along the laser trim line L1 by laser machining. For example, the external angle θ2 of the corner portion 40 is determined as appropriate in the range from about 30° to 45°. Although FIG. 5 is an enlarged view of the connection portion on the vehicle front side, the connection portion on the vehicle rear side is also configured similarly.

Figure 6A:
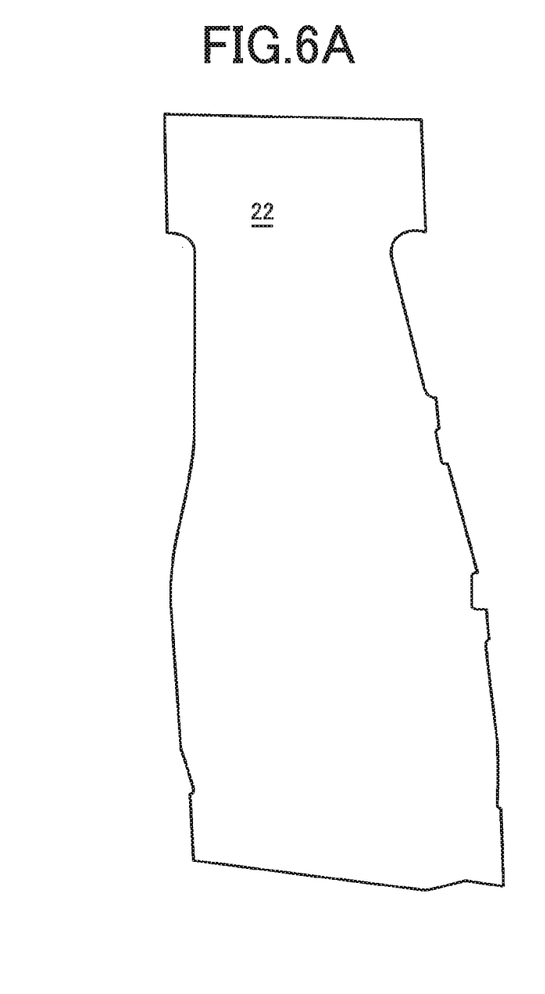
FIGS. 6A to 6C show views illustrating a process for manufacturing the center pillar reinforcement of FIGS. 1A and 1B.
Figure 6B:
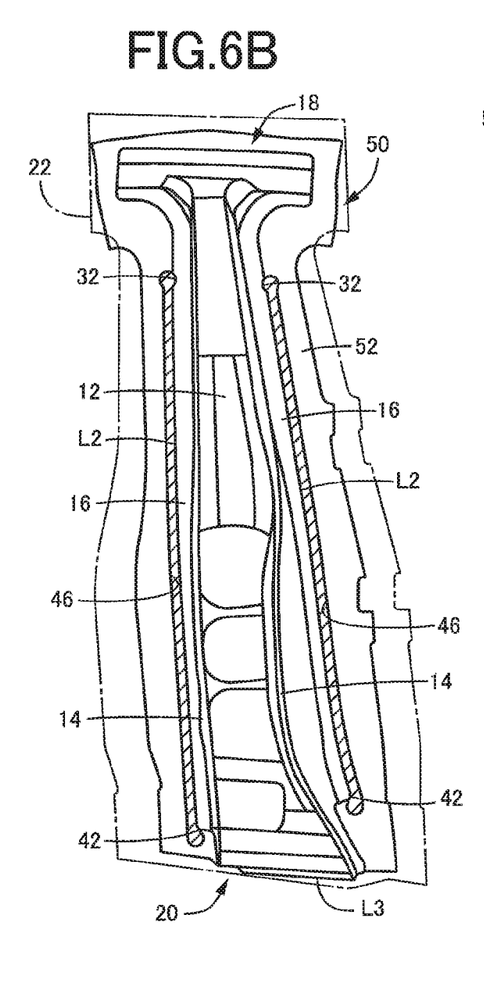
Figure 6C:
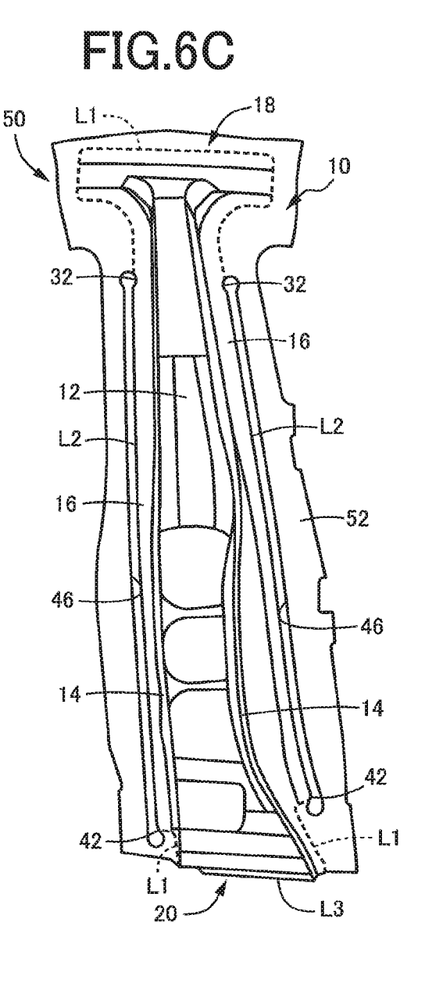

FIGS. 6A to 6C show views illustrating an example of a method for manufacturing the center pillar reinforcement 10 configured as described above. First, in a blanking step of FIG. 6A, the blank 22 is sheared from a sheet plate, such as a steel sheet for hot pressing, by cold pressing. Next, in a hot stamping step of FIG. 6B, the blank 22 is heated in a heating furnace to such a temperature that quenching can be performed, and is then formed into a shape with a hat-shaped section which has the projecting wall portion 12, the standing wall portions 14, and the flange portions 16 by a forming process mainly comprised of bending or drawing of hot pressing, and is quenched and hardened by cooling with a press die. An intermediate pressed product 50 is thus produced. In this stage, unlike the intended center pillar reinforcement 10, an excess outer peripheral portion 52 for blank holding, positioning, etc. is present in the outer peripheral portion. Accordingly, in the hot stamping step, a pair of slits 46 are formed along the boundary portions between the excess outer peripheral portion 52 and both sides of the center pillar reinforcement 10, specifically along the press trim lines L2, by shearing with a punching die included in a press machine for hot pressing. In FIG. 6B, the slits 46 are shown shaded for clarity. The press trim lines L2 are formed by forming the slits 46 by hot pressing. Each of the slits 46 has the recessed portion 32 and the convex arc-shaped portion 42. In addition to the slits 46, through holes etc. may be formed in, e.g., the projecting wall portion 12, the flange portions 16, etc. by shearing in the hot pressing.

Subsequently, in a laser trimming step shown in FIG. 6C, the upper end 18 is cut along its outer peripheral shape by laser machining, and both sides of the lower end 20 are similarly cut by laser machining. The laser trim lines L1 are thus formed so as to be connected to the press trim lines L2, and the excess outer peripheral portion 52 is cut off from the intermediate pressed product 50 to produce the intended center pillar reinforcement 10. In the laser trimming step as well, in addition to the laser trim lines L1, through holes etc. may be formed in, e.g., the standing wall portions 14 etc. by laser machining.

The outer peripheral shape of the center pillar reinforcement 10 of the present embodiment includes the laser trim lines L1 and the press trim lines L2, L3. Accordingly, only a minimum required range, such as a portion for which post-machining is required due to burrs etc., need only be cut off by laser machining. This reduces machining cost and machining time and thus improves productivity.

The laser trim line L1 and the press trim line L2 are connected via the projecting corner portions 30, 40. Accordingly, the shape of the connection portion therebetween is formed stably regardless of relative positional displacement between the trim lines L1, L2 due to variation in machining performance. Variation in machining quality which is caused by stepped portions, projections, etc. resulting from variation in machining performance is thus restrained as compared to the case where, e.g., the trim lines L1, L2 are smoothly connected so as to form a straight line, an arc, etc.

In the present embodiment, the laser trim line L1 forming the outer peripheral shape of the upper end 18 and each press trim line L2 are connected so as to form a straight line. However, each press trim line L2 has the recessed portion 32 or 34 at a position before the corner portion 30, and the laser trim line L1 is connected to the press trim line L2 so as to intersect the opening end of the recessed portion 32 or 34. This allows the trim lines L1, L2 to be appropriately connected while restraining variation in machining quality.

In the embodiment shown in FIG. 4, the laser trim line L1 and the press trim line L2 are connected via the recessed portion 34 to be used as a repair portion. Accordingly, design of the outer peripheral shape of the center pillar reinforcement 10 need not be changed, and variation in machining quality of the connection portion between the trim lines L1, L2 can be easily restrained.

In the present embodiment, the external angle of each corner portion 30, 40 is in the range from 20° to 60°. In other words, the internal angle of each corner portion 30, 40 is an obtuse angle in the range from 120° to 160°. Accordingly, the trim lines L1, L2 can be relatively smoothly connected while restraining variation in machining quality.

The present embodiment relates to the center pillar reinforcement 10, and the upper and lower ends 18, 20 of the center pillar reinforcement 10 are formed by the laser trim lines L1, and both sides of the intermediate portion connecting the ends 18, 20 are formed by the press trim lines L2. This reduces machining cost and machining time and thus improves productivity as compared to the case where the entire periphery is cut off by laser machining. That is, the upper and lower ends 18, 20 of the center pillar reinforcement 10 are curved so as to be tilted toward the interior side of the vehicle in the vertical direction or are formed in a complicated shape by bending in order to fix the upper and lower ends 18, 20 to the vehicle body. It is therefore difficult to appropriately cut the upper and lower ends 18, 20 by shearing in a pressing process due to the tendency to form burrs etc., and it is appropriate to cut the upper and lower ends 18, 20 by laser machining. On the other hand, since both sides of the intermediate portion have a relatively flat shape, both sides of the intermediate portion can be appropriately cut even by shearing in a pressing process. Accordingly, combining shearing in a pressing process and laser machining can achieve low machining cost and high productivity while ensuring predetermined machining quality.

Another embodiment of the present invention will be described below. In the following embodiment, those portions substantially common to the above embodiment are denoted with the same reference characters and detailed description thereof will be omitted.

Figure 7A:
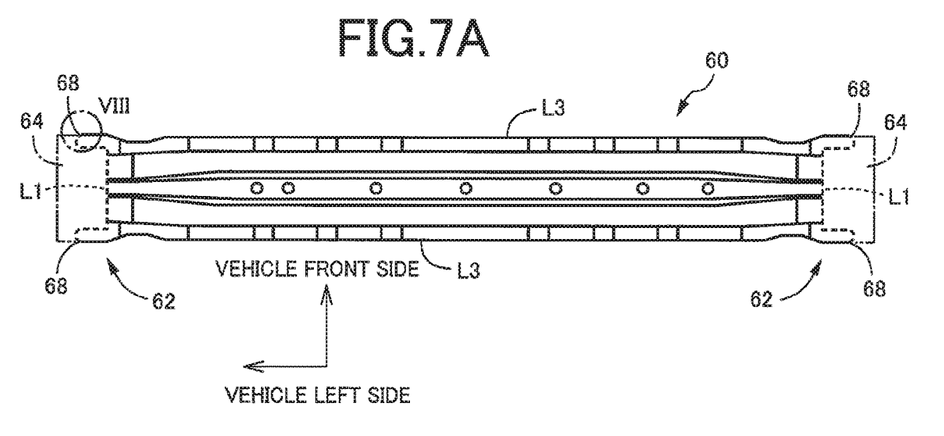
FIG. 7A is a plan view as viewed from a vehicle upper side.
Figure 7B:
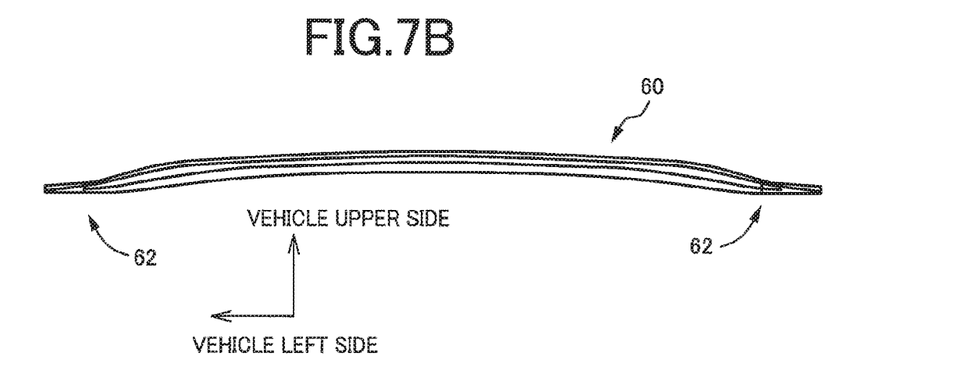
FIG. 7B is a front view as viewed from below in FIG. 7A.

FIGS. 7A and 7B show the case where the present invention is applied to a roof reinforcement 60 of a vehicle.

Figure 8:
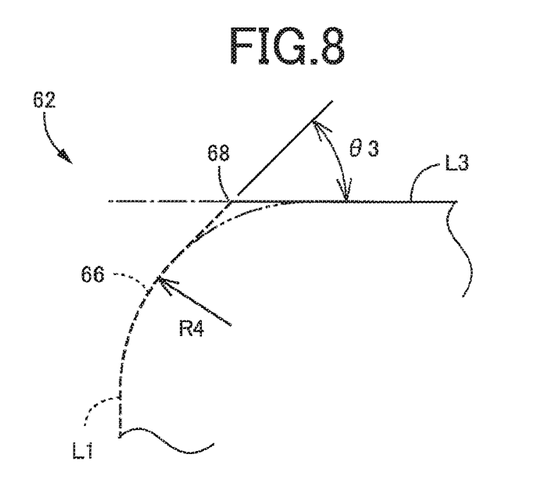
FIG. 8 is an enlarged view of a region VIII in FIG. 7A.

The roof reinforcement 60 has a longitudinal shape and is fixedly attached to a vehicle body at both ends 62 of the roof reinforcement 60 in the longitudinal direction, namely in the lateral direction of the vehicle. The ends 62 are therefore formed in a complicated shape by bending in order to fix the ends 62 to the vehicle body. It is difficult to appropriately cut the ends 62 by shearing in a pressing process due to the tendency to form burrs etc., and excess outer peripheral portions 64 shown by alternate long and short dash lines are cut off by laser machining. That is, the outer peripheral shapes of the ends 62 are formed by laser trim lines L1. A part of the outer peripheral shape of a blank obtained by blanking from a sheet plate etc. in cold pressing remains in the final shape. Both sides of an intermediate portion connecting the ends 62, namely both sides of the intermediate portion in the longitudinal direction of the vehicle, are the part remaining in the final shape and are formed by press trim lines L3 formed by blanking in the cold pressing. As can be seen from the laser trim line L1 and the press trim line L3 shown in an enlarged view of FIG. 8, the laser trim line L1 has a convex arc-shaped portion 66 of a predetermined radius R4. As the convex arc-shaped portion 66 is extended straight, from its intermediate position, in a direction of a tangent line to the convex arc-shaped portion 66, a projecting corner portion 68 is formed that intersects the straight press trim line L3 at a predetermined external angle θ3. For example, the external angle θ3 of the corner portion 68 is determined as appropriate in the range from about 30° to 45°. Although the laser trim lines L1 in FIGS. 7A and 8 are lines showing the outer peripheral shape of the roof reinforcement 60, the laser trim lines L1 are shown by dashed lines in the figures in order to clearly show the cutting range of laser machining. Although FIG. 8 is an enlarged view of the connection portion in the left end on the vehicle front side, the connection portions in the right end on the vehicle front side and in the right and left ends on the vehicle rear side are also configured similarly.

The outer peripheral shape of this roof reinforcement 60 is also formed by the laser trim lines L1 and the press trim lines L3, and the trim lines L1, L3 are connected via the projecting corner portion 68. This reduces machining cost and machining time and thus improves productivity while restraining variation in machining quality due to positional displacement between the trim lines L1, L3. The roof reinforcement 60 thus has functions and effects similar to those of the above embodiment.

Although the embodiments of the present invention are described in detail above based on the drawings, these embodiments are shown by way of example only and the present invention can be carried out in various modified or improved forms based on knowledge of those skilled in the art.

REFERENCE SIGNS LIST

10: Center pillar reinforcement (Hot-stamped and trimmed part)
18: Upper end
20: Lower end
22: Blank
30, 40, 68: Corner portion
32: Recessed portion
34: Recessed portion (Repair portion)
52, 64: Excess outer peripheral portion
60: Roof reinforcement (Hot-stamped and trimmed part)
L1: Laser trim line
L2, L3: Press trim line
θ1 to θ3: External angle of the corner portion

The invention claimed is:

1. A method for producing a hot-stamped and trimmed part, comprising:
   hot stamping a blank to form a hot-stamped part, and
   subsequently cutting off a respective excess peripheral portion from each of two opposite longitudinal ends of the hot-stamped part by laser machining to form a hot-stamped and trimmed part, wherein the hot-stamped and trimmed part has an outline including:
   a press trim line sheared in the step of hot stamping or in a step of pressing the blank performed before the step of hot stamping, and
   a first laser trim line and a second laser trim line cut in the step of laser machining, wherein the press trim line and the first laser trim line together define an outwardly projecting angle, wherein:
   the press trim line is positioned between the first and second laser trim lines in a longitudinal direction of the hot-stamped and trimmed part.

2. The method according to claim 1, wherein one of the first laser trim line and the press trim line includes an inwardly curved line, the inwardly curved line and the other of the first laser trim line and the press trim line together defining the outwardly projecting angle.

3. The method according to claim 1, wherein the outwardly projecting angle has an external angle within a range from 20° to 60°.

4. The method according to claim 1, wherein:
   the hot-stamped and trimmed part is a center pillar reinforcement of a vehicle, the center pillar reinforcement comprising an upper end section, a lower end section and an intermediate section, wherein the center pillar reinforcement is attached at the upper and lower end sections to a vehicle body, and
   the intermediate section has a side line containing the press trim line, and at least one of the upper and lower end sections has an outline containing the first laser trim line.

5. The method according to claim 1, wherein the outwardly projecting angle has a vertex where the press trim line and the laser trim line intersect.

6. The method according to claim 4, wherein at an outwardly projecting corner, the side line of the intermediate section intersects the outline of said at least one of the upper and lower end sections.

* * * * *